(12) United States Patent
Kasahara et al.

(10) Patent No.: US 12,119,178 B2
(45) Date of Patent: Oct. 15, 2024

(54) MULTILAYER CERAMIC CAPACITOR

(71) Applicant: Murata Manufacturing Co., Ltd., Nagaokakyo (JP)

(72) Inventors: Masahiro Kasahara, Nagaokakyo (JP); Ryota Karaya, Nagaokakyo (JP); Jun Kotani, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 151 days.

(21) Appl. No.: 17/947,214

(22) Filed: Sep. 19, 2022

(65) Prior Publication Data

US 2023/0094270 A1 Mar. 30, 2023

(30) Foreign Application Priority Data

Sep. 24, 2021 (JP) .................................. 2021-155321

(51) Int. Cl.
*H01G 4/012* (2006.01)
*H01G 4/232* (2006.01)
*H01G 4/30* (2006.01)

(52) U.S. Cl.
CPC ............. *H01G 4/012* (2013.01); *H01G 4/232* (2013.01); *H01G 4/30* (2013.01)

(58) Field of Classification Search
CPC ........... H01G 4/012; H01G 4/232; H01G 4/30
See application file for complete search history.

(56) References Cited

U.S. PATENT DOCUMENTS 5,339,068 A * 8/1994 Tsunoda ................. H01C 1/142
338/308
2005/0094351 A1 5/2005 Kobayashi
(Continued)

FOREIGN PATENT DOCUMENTS

JP 2005-136131 A 5/2005
JP 2013197503 A 9/2013
(Continued)

OTHER PUBLICATIONS

1 Office Action in JP2021-155321, mailed Dec. 12, 2023, 15 pages.
Office Action in JP2021-155321, mailed Feb. 27, 2024, 9 pages.

*Primary Examiner* — Michael P McFadden
(74) *Attorney, Agent, or Firm* — Keating & Bennett, LLP

(57) ABSTRACT

A multilayer ceramic capacitor includes a body including dielectric ceramic layers and internal electrode layers, and an external electrode. The body includes a capacitance generating portion where the dielectric ceramic layers and the internal electrode layers are alternately stacked in a thickness direction, a main surface covering portion on a main surface of the capacitance generating portion, a side surface covering portion on a side surface of the capacitance generating portion, and an end surface covering portion on an end surface of the capacitance generating portion. Each internal electrode layer includes an exposed portion exposed at the end surface, the end surface covering portion partially covers the exposed portion, and the external electrode is connected to the internal electrode layers and covers the end surface covering portion and a portion of the exposed portion of, the portion of the exposed portion not being covered by the end surface covering portion.

20 Claims, 7 Drawing Sheets

(56) References Cited

U.S. PATENT DOCUMENTS

| | | | |
|---|---|---|---|
| 2012/0019981 A1* | 1/2012 | Yoshida | H01F 27/292 361/321.1 |
| 2015/0340155 A1 | 11/2015 | Fukunaga et al. | |
| 2017/0076870 A1 | 3/2017 | Noda et al. | |
| 2018/0174753 A1* | 6/2018 | Terashita | H01G 4/008 |
| 2019/0131076 A1* | 5/2019 | Fukumura | H01G 4/232 |
| 2019/0385793 A1 | 12/2019 | Wakashima | |
| 2020/0051735 A1* | 2/2020 | Yeo | H01F 27/29 |
| 2021/0020367 A1* | 1/2021 | Yun | H01G 4/1227 |

FOREIGN PATENT DOCUMENTS

| | | | |
|---|---|---|---|
| JP | 2016201567 A | 12/2016 | |
| JP | 2017059633 A | 3/2017 | |
| KR | 20150134274 A | 12/2015 | |
| WO | 2018159838 A1 | 9/2018 | |

\* cited by examiner

MULTILAYER CERAMIC CAPACITOR

CROSS REFERENCE TO RELATED APPLICATIONS

This application claims the benefit of priority to Japanese Patent Application No. 2021-155321 filed on Sep. 24, 2021. The entire contents of this application are hereby incorporated herein by reference.

BACKGROUND OF THE INVENTION

1. Field of the Invention

The present invention relates to a multilayer ceramic capacitor.

2. Description of the Related Art

JP 2005-136131 A discloses a multilayer capacitor, such as a multilayer ceramic capacitor, which includes, as a main portion, a laminate having a cuboidal shape with a width dimension of 2 mm or less and including layered dielectric layers each between internal electrodes, and dielectrics at an outer periphery of the internal electrodes. The multilayer capacitor includes margins at both ends of the internal electrodes. The margin is where no internal electrodes are disposed between an end surface of the laminate and end portions of the internal electrodes. A margin ratio indicative of a ratio of a dimension of the margin to the width dimension of the laminate is in the range of 10% to 25% per margin at one side of the laminate.

In the multilayer capacitor disclosed in JP 2005-136131 A, the internal electrodes are led out to side surfaces of a dielectric body (laminate) and connected to terminal electrodes on the side surfaces of the dielectric body, as described in paragraph
and shown in FIG. 2 of JP 2005-136131 A.

Unfortunately, in the multilayer capacitor disclosed in JP 2005-136131 A, moisture which has entered through the boundary between the dielectric body and an inner end in the length direction of a terminal electrode (a left end of a terminal electrode 31 or a right end of a terminal electrode 32 in FIG. 2 of JP 2005-136131 A) may react with the terminal electrode, and a resulting component of the terminal electrode (e.g., a component of a plating solution when the terminal electrode includes a plating electrode layer) may reach an internal electrode near a side surface of the dielectric body. When the component of the terminal electrode reaches the internal electrode as described above, the internal electrode is corroded due to reaction with the component of the terminal electrode. As a result, the multilayer capacitor has poor properties in terms of insulation resistance, capacitance, equivalent series resistance, and the like. As described above, the multilayer capacitor disclosed in JP 2005-136131 A has a low moisture resistance.

SUMMARY OF THE INVENTION

Preferred embodiments of the present invention provide multilayer ceramic capacitors each having excellent moisture resistance.

A multilayer ceramic capacitor according to a preferred embodiment of the present invention includes a body including dielectric ceramic layers and internal electrode layers, and an external electrode, wherein the body includes a capacitance generating portion at which the dielectric ceramic layers and the internal electrode layers are alternately stacked in a thickness direction, a main surface covering portion on a main surface of the capacitance generating portion in the thickness direction, a side surface covering portion on a side surface of the capacitance generating portion in a width direction perpendicular or substantially perpendicular to the thickness direction, and an end surface covering portion on an end surface of the capacitance generating portion in a length direction perpendicular or substantially perpendicular to the thickness direction and the width direction, each of the internal electrode layers includes an exposed portion exposed at the end surface of the capacitance generating portion, the end surface covering portion is on the end surface of the capacitance generating portion and partially covers the exposed portion of each internal electrode layer, and the external electrode is connected to the internal electrode layers and covers the end surface covering portion and a portion of the exposed portion of each internal electrode layer, the portion of the exposed portion not being covered by the end surface covering portion.

Preferred embodiments of the present invention are able to provide multilayer ceramic capacitors each having excellent moisture resistance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, multilayer ceramic capacitors according to preferred embodiments of the present invention are described. The present invention is not limited to the following preferred embodiments and may be suitably modified without departing from the gist of the present invention. Combinations of two or more preferred features described in the following preferred embodiments are also within the scope of the present invention.

A multilayer ceramic capacitor according to a preferred embodiment of the present invention includes a body including dielectric ceramic layers and internal electrode layers, and an external electrode.

In one example of a multilayer ceramic capacitor according to a preferred embodiment of the present invention described below, the dielectric ceramic layers include a first dielectric ceramic layer and a second dielectric ceramic layer, the internal electrode layers include a first internal electrode layer and a second internal electrode layer, and the external electrode includes a first external electrode and a second external electrode.

Figure 1:
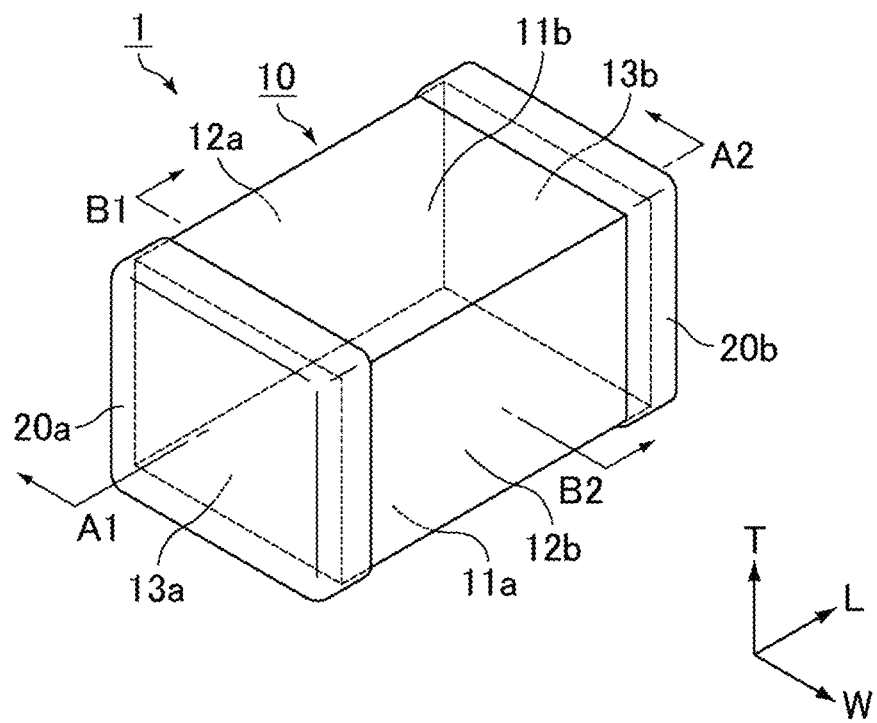
FIG. 1 is a schematic perspective view of an example of a multilayer ceramic capacitor according to a preferred embodiment of the present invention.

FIG. 1 is a schematic perspective view of an example of a multilayer ceramic capacitor according to a preferred embodiment of the present invention.

Herein, a length direction, a width direction, and a thickness direction are directions specified by L, W, and T, respectively, as shown in FIG. 1 and elsewhere. The length direction L, the width direction W, and the thickness direction T are perpendicular or substantially perpendicular to one another.

A multilayer ceramic capacitor 1 shown in FIG. 1 includes a body 10, a first external electrode 20a, and a second external electrode 20b.

The size of the multilayer ceramic capacitor 1 in terms of "dimension in the length direction L×dimension in the width direction W×dimension in the thickness direction T" is, for example, "about 1.6 mm×about 0.8 mm×about 0.8 mm", "about 1.0 mm×about 0.5 mm×about 0.5 mm", "about 0.6 mm×about 0.3 mm×about 0.3 mm", "about 0.4 mm×about 0.2 mm×about 0.2 mm", or "about 0.2 mm×about 0.1 mm×about 0.1 mm", for example.

The body 10 includes a first main surface 11a and a second main surface 11b opposite to each other in the thickness direction T, a first side surface 12a and a second side surface 12b opposite to each other in the width direction W, and a first end surface 13a and a second end surface 13b opposite to each other in the length direction L. The body 10 has a cuboidal or substantially cuboidal shape.

The first main surface 11a and the second main surface 11b of the body 10 are not necessarily strictly perpendicular to the thickness direction T. The first side surface 12a and the second side surface 12b of the body 10 are not necessarily strictly perpendicular to the width direction W. The first end surface 13a and the second end surface 13b of the body 10 are not necessarily strictly perpendicular to the length direction L.

Preferably, the body 10 includes rounded corners and ridges. The corner of the body 10 is a portion where three surfaces of the body 10 meet. The ridge of the body 10 is a portion where two surfaces of the body 10 meet.

In the multilayer ceramic capacitor of the present preferred embodiment, preferably, a dimension in the thickness direction of the body is about 0.150 mm or more and about 0.800 mm or less, for example.

A dimension in the thickness direction T of the body 10 is preferably, for example, about 0.150 mm or more and about 0.800 mm or less.

In the multilayer ceramic capacitor of the present preferred embodiment, a dimension in the width direction of the body is preferably, for example, about 0.150 mm or more and about 0.800 mm or less.

A dimension in the width direction W of the body 10 is preferably, for example, about 0.150 mm or more and about 0.800 mm or less.

In the multilayer ceramic capacitor of the present preferred embodiment, a dimension in the length direction of the body is preferably, for example, about 0.350 mm or more and about 1.600 mm or less.

A dimension in the length direction L of the body 10 is preferably, for example, about 0.350 mm or more and about 1.600 mm or less.

In the multilayer ceramic capacitor of the present preferred embodiment, preferably, for example, the dimension in the thickness direction of the body is about 0.150 mm or more and about 0.800 mm or less, the dimension in the width direction of the body is about 0.150 mm or more and about 0.800 mm or less, and the dimension in the length direction of the body is about 0.350 mm or more and about 1.600 mm or less.

In the multilayer ceramic capacitor of the present preferred embodiment, the body includes a capacitance generating portion at which the dielectric ceramic layers and the internal electrode layers are alternately stacked in the thickness direction, a main surface covering portion on a main surface of the capacitance generating portion in the thickness direction, a side surface covering portion on a side surface of the capacitance generating portion in the width direction perpendicular or substantially perpendicular to the thickness direction, and an end surface covering portion on an end surface of the capacitance generating portion in the length direction perpendicular or substantially perpendicular to the thickness direction and the width direction.

In one example of the multilayer ceramic capacitor of the present preferred embodiment, the main surface covering portion includes a first main surface covering portion and a second main surface covering portion, the side surface covering portion includes a first side surface covering portion and a second side surface covering portion, and the end surface covering portion includes a first end surface covering portion and a second end surface covering portion.

Figure 2:
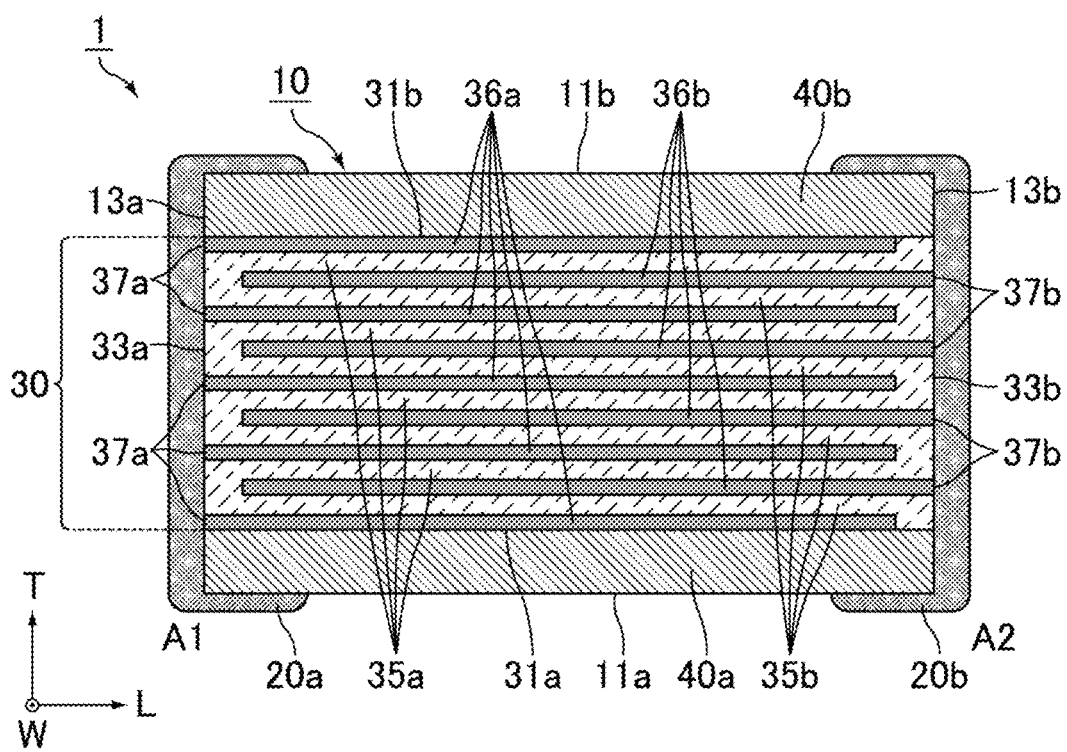
FIG. 2 is a schematic cross-sectional view of the multilayer ceramic capacitor shown in FIG. 1 taken along a line segment A1-A2.
Figure 3:
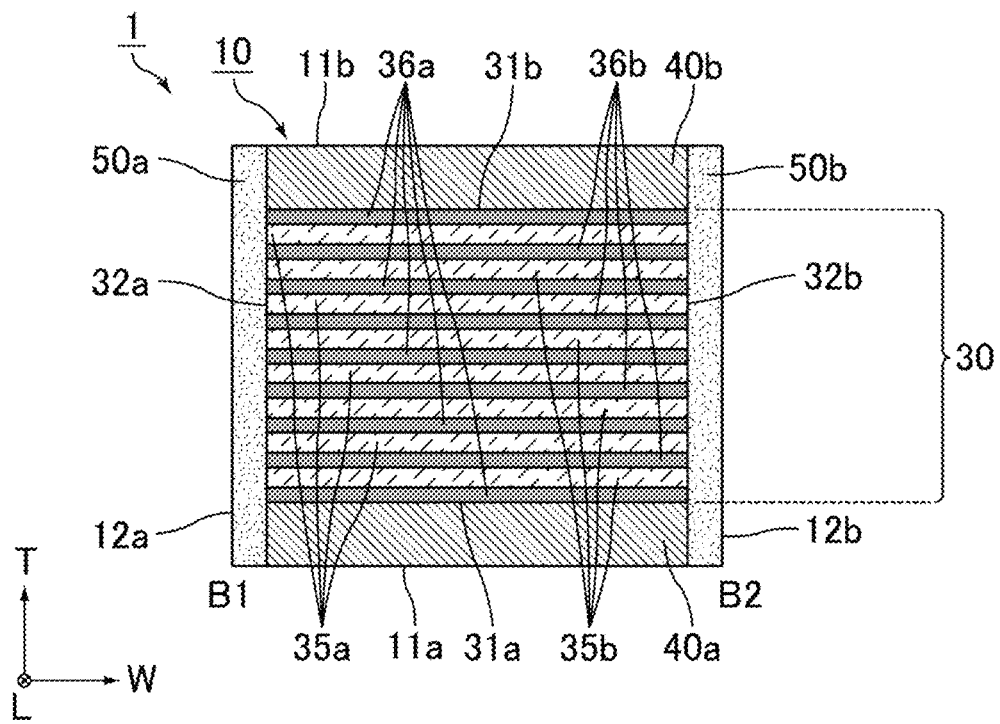
FIG. 3 is a schematic cross-sectional view of the multilayer ceramic capacitor shown in FIG. 1 taken along a line segment B1-B2.
Figure 4:
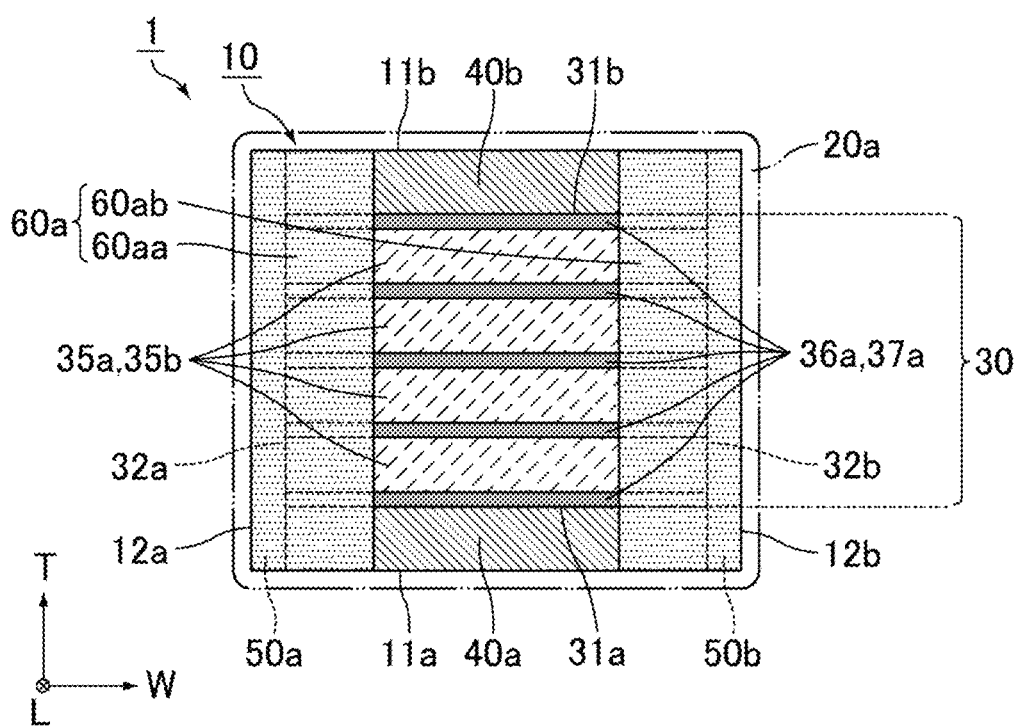
FIG. 4 is a schematic view of the multilayer ceramic capacitor shown in FIG. 1, viewed from a first external electrode side in a length direction.
Figure 5:
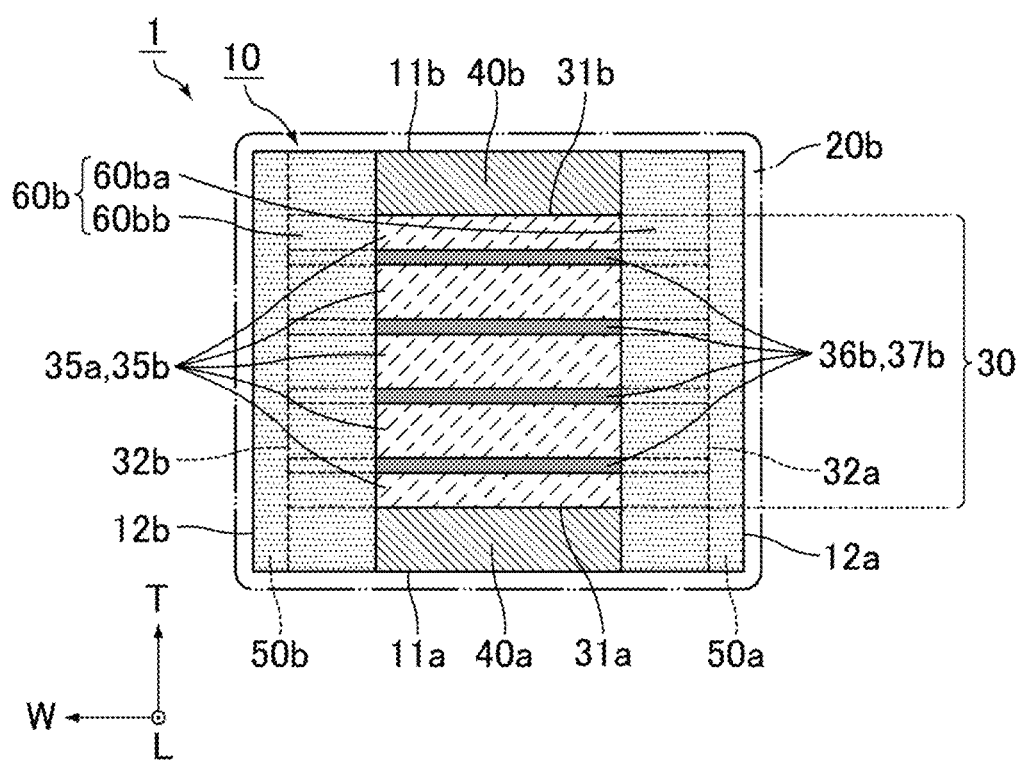
FIG. 5 is a schematic view of the multilayer ceramic capacitor shown in FIG. 1, viewed from a second external electrode side in the length direction.
Figure 6:
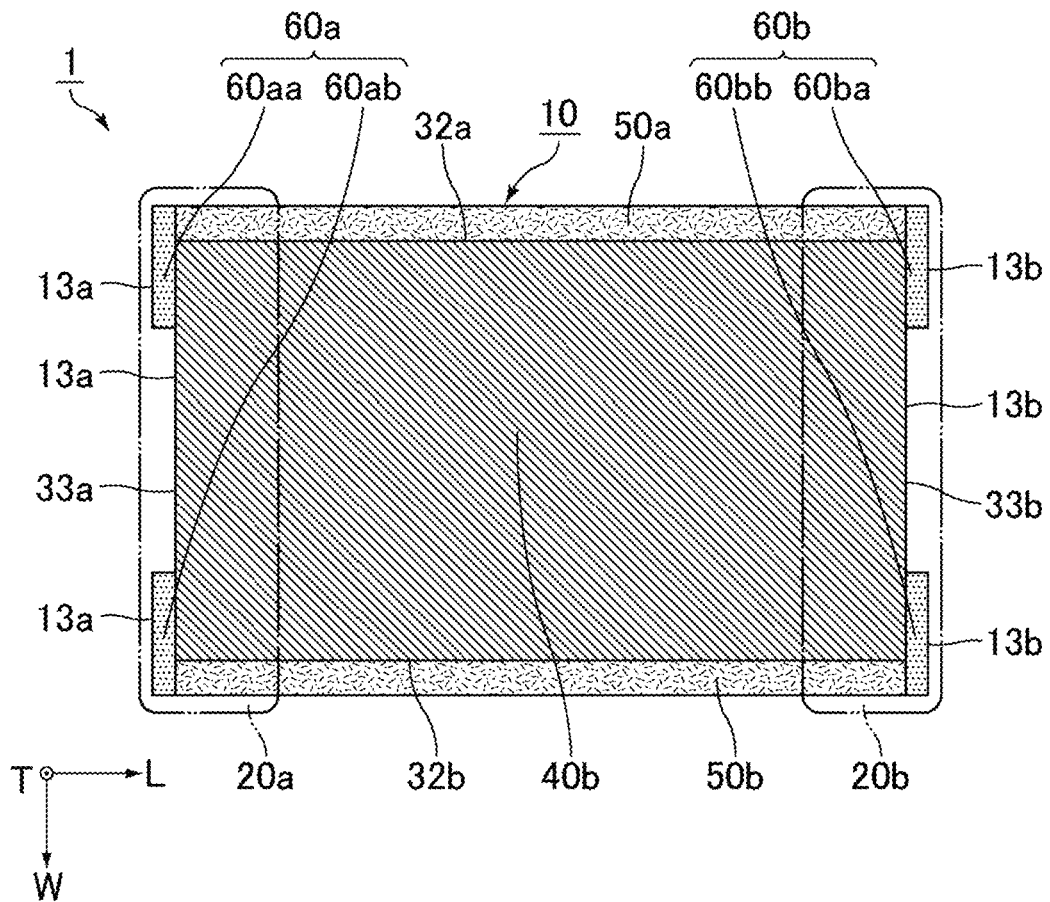
FIG. 6 is a schematic view of the multilayer ceramic capacitor shown in FIG. 1, viewed from a first main surface covering portion side in a thickness direction.

FIG. 2 is a schematic cross-sectional view of the multilayer ceramic capacitor shown in FIG. 1 taken along a line segment A1-A2. FIG. 3 is a schematic cross-sectional view of the multilayer ceramic capacitor shown in FIG. 1 taken along a line segment B1-B2. FIG. 4 is a schematic view of the multilayer ceramic capacitor shown in FIG. 1, viewed from the first external electrode side in the length direction. FIG. 4 shows a transparent view of the first external electrode. FIG. 5 is a schematic view of the multilayer ceramic capacitor shown in FIG. 1, viewed from the second external electrode side in the length direction. FIG. 5 shows a transparent view of the second external electrode. FIG. 6 is a schematic view of the multilayer ceramic capacitor shown in FIG. 1, viewed from the first main surface covering portion side in the thickness direction. FIG. 6 shows a transparent view of the first external electrode and the second external electrode.

The body 10 shown in FIG. 2, FIG. 3, FIG. 4, FIG. 5, and FIG. 6 includes a capacitance generating portion 30, a first main surface covering portion 40a, a second main surface covering portion 40b, a first side surface covering portion 50a, a second side surface covering portion 50b, a first end surface covering portion 60a, and a second end surface covering portion 60b.

In one example of the multilayer ceramic capacitor of the present preferred embodiment, the capacitance generating portion includes the first dielectric ceramic layer, the first internal electrode layer, the second dielectric ceramic layer, and the second internal electrode layer that are sequentially stacked in the thickness direction, and the capacitance generating portion includes a first main surface and a second main surface opposite to each other in the thickness direction, a first side surface and a second side surface opposite to each other in the width direction, and a first end surface and a second end surface opposite to each other in the length direction.

As shown in FIG. 2, the capacitance generating portion 30 includes a first dielectric ceramic layer 35a, a first internal electrode layer 36a, a second dielectric ceramic layer 35b, and a second internal electrode layer 36b that are sequentially stacked in the thickness direction T. More specifically, the capacitance generating portion 30 is a location at which the first dielectric ceramic layer 35a, the first internal electrode layer 36a on the first dielectric ceramic layer 35a, the second dielectric ceramic layer 35b on the first internal electrode layer 36a, and the second internal electrode layer 36b on the second dielectric ceramic layer 35b are sequentially and repeatedly stacked in the thickness direction T.

The first dielectric ceramic layer 35a and the second dielectric ceramic layer 35b extend in the width direction W and the length direction L.

Examples of materials of the first dielectric ceramic layer 35a and the second dielectric ceramic layer 35b include dielectric ceramic materials including a perovskite compound, such as $BaTiO_3$, $CaTiO_3$, $SrTiO_3$, or $CaZrO_3$, as a main component. The dielectric ceramic material may include, for example, in addition to any of the main components described above, an auxiliary component such as a Mn compound, a Fe compound, a Cr compound, a Co compound, or a Ni compound.

Herein, the term "main component" means a component with the highest weight ratio.

The first dielectric ceramic layer 35a and the second dielectric ceramic layer 35b may be made of the same or different materials.

The first internal electrode layer 36a and the second internal electrode layer 36b extend in a sheet form along the first dielectric ceramic layer 35a and the second dielectric ceramic layer 35b.

The first internal electrode layer 36a and the second internal electrode layer 36b are opposite to each other across the first dielectric ceramic layer 35a or the second dielectric ceramic layer 35b in the thickness direction T. In the capacitance generating portion 30, a capacitance is generated at a portion where the first internal electrode layer 36a and the second internal electrode layer 36b are opposite to each other.

As shown in FIG. 2 and FIG. 3, the capacitance generating portion 30 includes a first main surface 31a and a second main surface 31b opposite to each other in the thickness direction T, a first side surface 32a and a second side surface 32b opposite to each other in the width direction W, and a first end surface 33a and a second end surface 33b opposite to each other in the length direction L.

In the multilayer ceramic capacitor of the present preferred embodiment, each of the internal electrode layers includes an exposed portion exposed at the end surface of the capacitance generating portion.

In one example of the multilayer ceramic capacitor of the present preferred embodiment, the first internal electrode layer includes a first exposed portion exposed at the first end surface of the capacitance generating portion, and the second internal electrode layer includes a second exposed portion exposed at the second end surface of the capacitance generating portion.

As shown in FIG. 2, each first internal electrode layer 36a includes a first exposed portion 37a exposed at a first end surface 33a of the capacitance generating portion 30. Each first internal electrode layer 36a is not exposed at the second end surface 33b of the capacitance generating portion 30.

As shown in FIG. 3, each first internal electrode layer 36a is also exposed at the first side surface 32a and the second side surface 32b of the capacitance generating portion 30.

As shown in FIG. 2, each second internal electrode layer 36b includes a second exposed portion 37b exposed at the second end surface 33b of the capacitance generating portion 30. Each second internal electrode layer 36b is not exposed at the first end surface 33a of the capacitance generating portion 30.

As shown in FIG. 3, each second internal electrode layer 36b is also exposed at the first side surface 32a and the second side surface 32b of the capacitance generating portion 30.

Examples of materials of the first internal electrode layer 36a and the second internal electrode layer 36b include metals such as Ni, Cu, Ag, Pd, Ag—Pd alloys, and Au. The materials of the first internal electrode layer 36a and the second internal electrode layer 36b may include, in addition to any of the metals described above, any of the dielectric ceramic materials of the first dielectric ceramic layer 35a or the second dielectric ceramic layer 35b.

The first internal electrode layer 36a and the second internal electrode layer 36b may be made of the same or different materials.

The dimensions in the thickness direction T of the first internal electrode layer 36a and the second internal electrode layer 36b are each about 0.40 μm or more and about 1.20 μm or less, for example.

The dimension in the thickness direction T of the first internal electrode layer 36a may be the same as or different from the dimension in the thickness direction T of the second internal electrode layer 36b.

In one example of the multilayer ceramic capacitor of the present preferred embodiment, the main surface covering portion includes a first main surface covering portion on the first main surface of the capacitance generating portion and a second main surface covering portion on the second main surface of the capacitance generating portion.

As shown in FIG. 2, FIG. 3, FIG. 4, and FIG. 5, the first main surface covering portion 40a is on the first main surface 31a of the capacitance generating portion 30.

As shown in FIG. 2, FIG. 3, FIG. 4, and FIG. 5, the second main surface covering portion 40b is on the second main surface 31b of the capacitance generating portion 30.

The first main surface covering portion 40a and the second main surface covering portion 40b sandwich the capacitance generating portion 30 in the thickness direction T.

A surface of the first main surface covering portion 40a defines the first main surface 11a of the body 10.

A surface of the second main surface covering portion 40b defines the second main surface 11b of the body 10.

The first main surface covering portion 40a and the second main surface covering portion 40b are each made of an insulating material, for example. Preferably, the first main surface covering portion 40a and the second main surface covering portion 40b are each made of a ceramic material. When made of a ceramic material, the first main surface covering portion 40a and the second main surface covering portion 40b can be fired simultaneously with the capacitance generating portion 30 during production of the body 10.

Examples of ceramic materials of the first main surface covering portion 40a and the second main surface covering portion 40b include the dielectric ceramic materials listed as examples of the materials of the first dielectric ceramic layer 35a and the second dielectric ceramic layer 35b.

The first main surface covering portion 40a and the second main surface covering portion 40b may be made of the same or different materials.

Preferably, the first main surface covering portion 40a, the second main surface covering portion 40b, the first dielectric ceramic layer 35a, and the second dielectric ceramic layer 35b are made of the same materials. However, the materials may be different from one another or may be partially different from one another. For example, when at least one additive selected from the group consisting of Mn, Mg, and Si is added to the material of each member, the proportion of the additive may vary among the materials of the members.

In the multilayer ceramic capacitor of the present preferred embodiment, the dimension in the thickness direction of the main surface covering portion is preferably, for example, about 28 μm or more and about 80 μm or less.

Herein, the dimension in the thickness direction of the main surface covering portion refers to the dimension in the thickness direction of the main surface covering portion on one main surface of the capacitance generating portion. For example, when the main surface covering portion is on each of the first main surface and the second main surface of the capacitance generating portion, the dimension in the thickness direction of the main surface covering portion refers to each of the dimensions in the thickness direction of the main surface covering portions on the first main surface and the second main surface of the capacitance generating portion.

The dimension in the thickness direction T of the first main surface covering portion 40a and the dimension in the thickness direction T of the second main surface covering portion 40b are each preferably, for example, about 28 μm or more and about 80 μm or less.

The dimension in the thickness direction T of the first main surface covering portion 40a may be the same as or different from the dimension in the thickness direction T of the second main surface covering portion 40b.

The dimension in the thickness direction of the main surface covering portion is measured on a cross section passing through a central portion in the width direction of the body and extending along the length direction and the thickness direction (see FIG. 2), with an optical microscope or an electron microscope.

In one example of the multilayer ceramic capacitor of the present preferred embodiment, the side surface covering portion includes a first side surface covering portion on the first side surface of the capacitance generating portion, and a second side surface covering portion on the second side surface of the capacitance generating portion.

As shown in FIG. 3, FIG. 4, FIG. 5, and FIG. 6, the first side surface covering portion 50a is on the first side surface 32a of the capacitance generating portion 30. More specifically, the first side surface covering portion 50a is on the first side surface 32a of the capacitance generating portion 30 to cover the first internal electrode layer 36a and the second internal electrode layer 36b exposed at the first side surface 32a of the capacitance generating portion 30.

As shown in FIG. 3, FIG. 4, FIG. 5, and FIG. 6, the second side surface covering portion 50b is on the second side surface 32b of the capacitance generating portion 30. More specifically, the second side surface covering portion 50b is on the second side surface 32b of the capacitance generating portion 30 to cover the first internal electrode layer 36a and the second internal electrode layer 36b exposed at the second side surface 32b of the capacitance generating portion 30.

The first side surface covering portion 50a and the second side surface covering portion 50b sandwich the capacitance generating portion 30 in the width direction W.

A surface of the first side surface covering portion 50a defines the first side surface 12a of the body 10.

A surface of the second side surface covering portion 50b defines the second side surface 12b of the body 10.

The first side surface covering portion 50a and the second side surface covering portion 50b are each preferably made of an insulating material, for example. Preferably, the first side surface covering portion 50a and the second side surface covering portion 50b are each made of a ceramic material. When made of a ceramic material, the first side surface covering portion 50a and the second side surface covering portion 50b can be fired simultaneously with the capacitance generating portion 30 during production of the body 10.

Examples of ceramic materials of the first side surface covering portion 50a and the second side surface covering portion 50b include the dielectric ceramic materials listed as examples of the materials of the first dielectric ceramic layer 35a and the second dielectric ceramic layer 35b.

The first side surface covering portion 50a and the second side surface covering portion 50b may be made of the same or different materials.

Preferably, the first side surface covering portion 50a, the second side surface covering portion 50b, the first dielectric ceramic layer 35a, the second dielectric ceramic layer 35b, the first main surface covering portion 40a, and the second main surface covering portion 40b are made of the same materials. However, the materials may be different from one another or may be partly different from one another. For example, when at least one additive selected from the group consisting of Mn, Mg, and Si is added to the material of each member, the proportion of the additive may vary among the materials of the members.

In the multilayer ceramic capacitor of the present preferred embodiment, the dimension in the width direction of the side surface covering portion is preferably, for example, about 10 μm or more and about 50 μm or less.

Herein, the dimension in the width direction of the side surface covering portion refers to the dimension in the width direction of the side surface covering portion on one side surface of the capacitance generating portion. For example, when the side surface covering portion is on each of the first side surface and the second side surface of the capacitance generating portion, the dimension in the width direction of the side surface covering portion refers to each of the dimensions in the width direction of the side surface covering portions on the first side surface and the second side surface of the capacitance generating portion.

The dimension in the width direction W of the first side surface covering portion 50a and the dimension in the width direction W of the second side surface covering portion 50b are each preferably, for example, about 10 μm or more and about 50 μm or less.

The dimension in the width direction W of the first side surface covering portion 50a may be the same as or different from the dimension in the width direction W of the second side surface covering portion 50b.

The dimension in the width direction of the side surface covering portion is measured on a cross section passing through a central portion in the length direction of the body and extending along the width direction and the thickness direction (see FIG. 3), with an optical microscope or an electron microscope.

In the multilayer ceramic capacitor of the present preferred embodiment, the end surface covering portion is on the end surface of the capacitance generating portion to partially cover the exposed portion of each internal electrode layer.

In one example of the multilayer ceramic capacitor of the present preferred embodiment, the end surface covering portion includes a first end surface covering portion on the first end surface of the capacitance generating portion to partially cover the first exposed portion of the first internal electrode layer, and a second end surface covering portion on the second end surface of the capacitance generating portion to partially cover the second exposed portion of the second internal electrode layer.

As shown in FIG. 4 and FIG. 6, the first end surface covering portion 60a is on the first end surface 33a of the capacitance generating portion 30 to partially cover the first exposed portion 37a of each first internal electrode layer 36a. In other words, the remaining portion of the first exposed portion 37a of each first internal electrode layer 36a is exposed without being covered by the first end surface covering portion 60a. Furthermore, the first end surface 33a of the capacitance generating portion 30 is partially exposed without being covered by the first end surface covering portion 60a.

As shown in FIG. 4, when multiple first internal electrode layers 36a each include the first exposed portion 37a, preferably, the first end surface covering portion 60a is on the first end surface 33a of the capacitance generating portion 30 to partially cover each of the first exposed portions 37a.

In the examples shown in FIG. 4 and FIG. 6, the first end surface covering portion 60a is on the first end surface 33a of the capacitance generating portion 30 in a divided manner in the width direction W to cover both end portions excluding a central portion in the width direction W of the first exposed portion 37a of each first internal electrode layer 36a. More specifically, the first end surface covering portion 60a is divided into a first portion 60aa adjacent to the first side surface 12a of the body 10 and a second portion 60ab adjacent to the second side surface 12b of the body 10 in the width direction W. The first portion 60aa of the first end surface covering portion 60a partially covers the first exposed portion 37a of each first internal electrode layer 36a, at the first side surface 32a side of the capacitance generating portion 30. The second portion 60ab of the first end surface covering portion 60a partially covers the first exposed portion 37a of each first internal electrode layer 36a, at the second side surface 32b side of the capacitance generating portion 30.

The first end surface covering portion 60a may be divided as shown in FIG. 4 and FIG. 6 or may not be divided, as long as the first end surface covering portion 60a partially covers the first exposed portion 37a of each first internal electrode layer 36a.

As shown in FIG. 5 and FIG. 6, the second end surface covering portion 60b is on the second end surface 33b of the capacitance generating portion 30 to partially cover the second exposed portion 37b of each second internal electrode layer 36b. In other words, the remaining portion of the second exposed portion 37b of each second internal electrode layer 36b is exposed without being covered by the second end surface covering portion 60b. Furthermore, the second end surface 33b of the capacitance generating portion 30 is partially exposed without being covered by the second end surface covering portion 60b.

As shown in FIG. 5, when multiple second internal electrode layers 36b each include the second exposed portion 37b, preferably, the second end surface covering portion 60b is on the second end surface 33b of the capacitance generating portion 30 to partially cover each of the second exposed portions 37b.

In the examples shown in FIG. 5 and FIG. 6, the second end surface covering portion 60b is on the second end surface 33b of the capacitance generating portion 30 in a divided manner in the width direction W to cover both end portions excluding a central portion in the width direction W of the second exposed portion 37b of each second internal electrode layer 36b. More specifically, the second end surface covering portion 60b is divided into a first portion 60ba adjacent to the first side surface 12a of the body 10 and a second portion 60bb adjacent to the second side surface 12b of the body 10 in the width direction W. The first portion 60ba of the second end surface covering portion 60b partially covers the second exposed portion 37b of each second internal electrode layer 36b, at the first side surface 32a side of the capacitance generating portion 30. The second portion 60bb of the second end surface covering portion 60b partially covers the second exposed portion 37b of each second internal electrode layer 36b, at the second side surface 32b side of the capacitance generating portion 30.

The second end surface covering portion 60b may be divided as shown in FIG. 5 and FIG. 6 or may not be divided, as long as the second end surface covering portion 60b partially covers the second exposed portion 37b of each second internal electrode layer 36b.

The first end surface covering portion 60a and the second end surface covering portion 60b sandwich the capacitance generating portion 30 in the length direction L.

A surface of the first end surface covering portion 60a and the first end surface 33a, which is exposed without being covered by the first end surface covering portion 60a, of the capacitance generating portion 30 define the first end surface 13a of the body 10.

A surface of the second end surface covering portion 60b and the second end surface 33b, which is exposed without being covered by the second end surface covering portion 60b, of the capacitance generating portion 30 define the second end surface 13b of the body 10.

The first end surface covering portion 60a and the second end surface covering portion 60b are each preferably made of, for example, an insulating material. Preferably, the first end surface covering portion 60a and the second end surface covering portion 60b are each made of a ceramic material.

When made of a ceramic material, the first end surface covering portion 60a and the second end surface covering portion 60b can be fired simultaneously with the capacitance generating portion 30 during production of the body 10.

Examples of ceramic materials of the first end surface covering portion 60a and the second end surface covering portion 60b include the dielectric ceramic materials listed as examples of the materials of the first dielectric ceramic layer 35a and the second dielectric ceramic layer 35b.

The first end surface covering portion 60a and the second end surface covering portion 60b may be made of the same or different materials.

The first end surface covering portion 60a, the second end surface covering portion 60b, the first dielectric ceramic layer 35a, the second dielectric ceramic layer 35b, the first main surface covering portion 40a, the second main surface covering portion 40b, the first side surface covering portion 50a, and the second side surface covering portion 50b are preferably made of the same materials. However, the materials may be different from one another or may be partially different from one another. For example, when at least one additive selected from the group consisting of Mn, Mg, and Si is added to the material of each member, the proportion of the additive may vary among the materials of the members.

The first external electrode 20a is on the first end surface 13a of the body 10. As shown in FIG. 1 and elsewhere, the first external electrode 20a may extend from the first end surface 13a of the body 10 to a portion of the first main surface 11a, a portion of the second main surface 11b, a portion of the first side surface 12a, and a portion of the second side surface 12b.

The second external electrode 20b is on the second end surface 13b of the body 10. As shown in FIG. 1 and elsewhere, the second external electrode 20b may extend from the second end surface 13b of the body 10 to a portion of the first main surface 11a, a portion of the second main surface 11b, a portion of the first side surface 12a, and a portion of the second side surface 12b.

Preferably, each of the first external electrode 20a and the second external electrode 20b includes, for example, a base electrode layer and a plating electrode layer sequentially from the body 10 side.

Preferably, the base electrode layer is in contact with the body 10.

Examples of materials of the base electrode layer include metals such as Cu, Ni, Ag, Pd, Ag—Pd alloys, and Au.

The base electrode layer may be formed by being fired simultaneously with the first internal electrode layer 36a and the second internal electrode layer 36b (co-firing method) or may be formed by applying a conductive paste to the fired body 10 and firing (post-firing method). Alternatively, the base electrode layer may be formed by the plating method or a method that cures a conductive resin including a thermosetting resin.

The base electrode layer may include a single layer or multiple layers.

Examples of materials of the plating electrode layer include metals such as Cu, Ni, Ag, Pd, Ag—Pd alloys, and Au.

The plating electrode layer may include a single layer or multiple layers.

When the plating electrode layer includes multiple layers, preferably, the plating electrode layer includes, for example, a Ni plating electrode layer and a Sn plating electrode layer sequentially from the base electrode layer side.

Each of the first external electrode 20a and the second external electrode 20b may include, between the base electrode layer and the plating electrode layer, a conductive resin layer for relaxing stress.

In the multilayer ceramic capacitor of the present preferred embodiment, the external electrode is connected to the internal electrode layers and covers the end surface covering portion and a portion of the exposed portion of each internal electrode layer, the portion of the exposed portion not being covered by the end surface covering portion.

In one example of the multilayer ceramic capacitor of the present preferred embodiment, the external electrode includes a first external electrode connected to the first internal electrode layer and covering the first end surface covering portion and a portion of the first exposed portion of the first internal electrode layer, the portion of the first exposed portion not being covered by the first end surface covering portion, and a second external electrode connected to the second internal electrode layer and covering the second end surface covering portion and a portion of the second exposed portion of the second internal electrode layer, the portion of the second exposed portion not being covered by the second end surface covering portion.

As shown in FIG. 4 and FIG. 6, the first external electrode 20a covers the first end surface covering portion 60a and the first exposed portion 37a, which is not covered by the first end surface covering portion 60a, of each first internal electrode layer 36a. More specifically, the first external electrode 20a covers the first exposed portion 37a, which is not covered by the first portion 60aa and the second portion 60ab of the first end surface covering portion 60a, of each first internal electrode layer 36a, the first portion 60aa of the first end surface covering portion 60a, and the second portion 60ab of the first end surface covering portion 60a. In this way, on the first end surface 33a of the capacitance generating portion 30, the first external electrode 20a is connected to each first internal electrode layer 36a, more specifically, to the first exposed portion 37a, which is not covered by the first end surface covering portion 60a, of each first internal electrode layer 36a.

The multilayer ceramic capacitor 1 includes the first end surface covering portion 60a to partially cover the first exposed portion 37a of each first internal electrode layer 36a. When the first end surface covering portion 60a is disposed as described above, a moisture ingress pathway from the boundary between the body 10 and an inner end in the length direction L of the first external electrode 20a to the first exposed portion 37a of the first internal electrode layer 36a is extended, as compared to when the first end surface covering portion 60 is not disposed. Here, the inner end in the length direction L of the first external electrode 20a refers to an end (adjacent to the second external electrode 20b) of the first external electrode 20a on each of the first main surface 11a, the second main surface 11b, the first side surface 12a, and the second side surface 12b of the body 10. Thus, while a component of the first external electrode 20a is generated by reaction with the moisture that has entered (e.g., a component of a plating solution when the first external electrode 20a includes a plating electrode layer), the amount of the component that reaches the first exposed portion 37a of the first internal electrode layer 36a is reduced. This prevents or reduces corrosion of the first internal electrode layer 36a caused by the reaction with the component of the first external electrode 20a. As a result, the properties such as insulation resistance, capacitance, and equivalent series resistance of the multilayer ceramic capacitor 1 are less likely to be reduced. In other words, the multilayer ceramic capacitor 1 has an improved moisture resistance.

As shown in FIG. 5 and FIG. 6, the second external electrode 20*b* covers the second end surface covering portion 60*b* and the second exposed portion 37*b*, which is not covered by the second end surface covering portion 60*b*, of the second internal electrode layer 36*b*. More specifically, the second external electrode 20*b* covers the second exposed portion 37*b*, which is not covered by the first portion 60*ba* and the second portion 60*bb* of the second end surface covering portion 60*b*, of the second internal electrode layer 36*b*, the first portion 60*ba* of the second end surface covering portion 60*b*, and the second portion 60*bb* of the second end surface covering portion 60*b*. In this way, on the second end surface 33*b* of the capacitance generating portion 30, the second external electrode 20*b* is connected to the second internal electrode layer 36*b*, more specifically, to the second exposed portion 37*b*, which is not covered by the second end surface covering portion 60*b*, of the second internal electrode layer 36*b*.

The multilayer ceramic capacitor 1 includes the second end surface covering portion 60*b* to partially cover the second exposed portion 37*b* of each second internal electrode layer 36*b*. When the second end surface covering portion 60*b* is disposed as described above, a moisture ingress pathway from the boundary between the body 10 and an inner end in the length direction L of the second external electrode 20*b* to the second exposed portion 37*b* of the second internal electrode layer 36*b* is extended, as compared to when the second end surface covering portion 60*b* is not disposed. Here, the inner end in the length direction L of the second external electrode 20*b* refers to an end (adjacent to the first external electrode 20*a*) of the second external electrode 20*b* on each of the first main surface 11*a*, the second main surface 11*b*, the first side surface 12*a*, and the second side surface 12*b* of the body 10. Thus, while a component of the second external electrode 20*b* is generated by reaction with the moisture that has entered (e.g., a component of a plating solution when the second external electrode 20*b* includes a plating electrode layer), the amount of the component that reaches the second exposed portion 37*b* of the second internal electrode layer 36*b* is reduced. This prevents or reduces corrosion of the second internal electrode layer 36*b* caused by the reaction with the component of the second external electrode 20*b*. As a result, the properties such as insulation resistance, capacitance, and equivalent series resistance of the multilayer ceramic capacitor 1 are less likely to be reduced. In other words, the multilayer ceramic capacitor 1 has an improved moisture resistance.

As described above, the multilayer ceramic capacitor 1 has an excellent moisture resistance due to the presence of the first end surface covering portion 60*a* and the second end surface covering portion 60*b*.

The multilayer ceramic capacitor 1 includes both the first end surface covering portion 60*a* and the second end surface covering portion 60*b* but may include only one of the first end surface covering portion 60*a* and the second end surface covering portion 60*b*. In terms of improved moisture resistance, preferably, the multilayer ceramic capacitor 1 includes both the first end surface covering portion 60*a* and the second end surface covering portion 60*b*.

Preferably, the multilayer ceramic capacitor of the present preferred embodiment has the following features not only in terms of improved moisture resistance but also in terms of balance between improved moisture resistance and reduced change in capacitance over time.

In the multilayer ceramic capacitor of the present preferred embodiment, preferably, the side surface covering portion is in contact with the end surface covering portion.

As shown in FIG. 6, preferably, the first side surface covering portion 50*a* is in contact with the first end surface covering portion 60*a*, more specifically, with the first portion 60*aa* of the first end surface covering portion 60*a*.

As shown in FIG. 6, preferably, the first side surface covering portion 50*a* is in contact with the second end surface covering portion 60*b*, more specifically, with the first portion 60*ba* of the second end surface covering portion 60*b*.

As shown in FIG. 6, preferably, the second side surface covering portion 50*b* is in contact with the first end surface covering portion 60*a*, more specifically, with the second portion 60*ab* of the first end surface covering portion 60*a*.

As shown in FIG. 6, the second side surface covering portion 50*b* is in contact with the second end surface covering portion 60*b*, more specifically, with the second portion 60*bb* of the second end surface covering portion 60*b*.

In the multilayer ceramic capacitor of the present preferred embodiment, when the side surface covering portion is in contact with the end surface covering portion, preferably, the side surface covering portion is integrated with the end surface covering portion.

The first side surface covering portion 50*a* is integrated with the first end surface covering portion 60*a*, more specifically, with the first portion 60*aa* of the first end surface covering portion 60*a*.

Preferably, the first side surface covering portion 50*a* is integrated with the second end surface covering portion 60*b*, more specifically, with the first portion 60*ba* of the second end surface covering portion 60*b*.

Preferably, the second side surface covering portion 50*b* is integrated with the first end surface covering portion 60*a*, more specifically, with the second portion 60*ab* of the first end surface covering portion 60*a*.

Preferably, the second side surface covering portion 50*b* is integrated with the second end surface covering portion 60*b*, more specifically, with the second portion 60*bb* of the second end surface covering portion 60*b*.

In the multilayer ceramic capacitor of the present preferred embodiment, the dimension in the width direction of the end surface covering portion is preferably, for example, about 5 μm or more and about 200 μm or less, and more preferably about 140 μm or more and about 160 μm or less.

Herein, the dimension in the width direction of the end surface covering portion refers to the dimension in the width direction of the end surface covering portion on one end surface of the capacitance generating portion. More specifically, the dimension in the width direction of the end surface covering portion refers to the dimension obtained by subtracting the dimension in the width direction of the part (not covered by the end surface covering portion) of the exposed portion of the internal electrode layer from the dimension in the width direction of the body, viewed from the external electrode side in the length direction. For example, when the end surface covering portion is on each of the first end surface and the second end surface of the capacitance generating portion, the dimension in the width direction of the end surface covering portion refers to each of the dimensions in the width direction of the end surface covering portions on the first end surface and the second end surface of the capacitance generating portion.

The dimension in the width direction W of the first end surface covering portion 60*a* and the dimension in the width direction W of the second end surface covering portion 60b are each preferably, for example, about 5 µm or more and about 200 µm or less, and more preferably about 140 µm or more and about 160 µm or less.

The dimension in the width direction W of the first end surface covering portion 60a may be the same as or different from the dimension in the width direction W of the second end surface covering portion 60b.

When the first end surface covering portion 60a is divided in the width direction W as shown in FIG. 4 and FIG. 6, the dimension in the width direction W of the first end surface covering portion 60a is the sum of the dimensions in the width direction W of the divided portions. Herein, the dimension in the width direction W is defined by the sum of the dimensions in the width direction W of the first portion 60aa and the second portion 60ab of the first end surface covering portion 60a. The dimension in the width direction W of the second end surface covering portion 60b is defined similarly.

In the multilayer ceramic capacitor of the present preferred embodiment, the dimension in the length direction of the end surface covering portion is preferably, for example, about 5 µm or more and about 50 µm or less, more preferably about 5 µm or more and about 15 µm or less.

Herein, the dimension in the length direction of the end surface covering portion refers to the dimension in the length direction of the end surface covering portion on one end surface of the capacitance generating portion. For example, when the end surface covering portion is on each of the first end surface and the second end surface of the capacitance generating portion, the dimension in the length direction of the end surface covering portion refers to each of the dimensions in the length direction of the end surface covering portions on the first end surface and the second end surface of the capacitance generating portion.

The dimension in the length direction L of the first end surface covering portion 60a and the dimension in the length direction L of the second end surface covering portion 60b are each preferably 5 µm or more and 50 µm or less, and more preferably about 5 µm or more and about 15 µm or less.

The dimension in the length direction L of the first end surface covering portion 60a may be the same as or different from the dimension in the length direction L of the second end surface covering portion 60b.

When the first end surface covering portion 60a is divided in the width direction W as shown in FIG. 4 and FIG. 6, the dimension in the length direction L of the first end surface covering portion 60a is defined by a smaller dimension between the dimensions in the length direction L of the divided portions. Herein, the dimension in the length direction L is defined by a smaller dimension between the dimensions in the length direction L of the first portion 60aa and the second portion 60ab of the first end surface covering portion 60a. The dimension in the length direction L of the second end surface covering portion 60b is defined similarly.

In the multilayer ceramic capacitor of the present preferred embodiment, preferably, the dimension in the width direction of the end surface covering portion is, for example, about 5 µm or more and about 200 µm or less, and the dimension in the length direction of the end surface covering portion is, for example, about 5 µm or more and about 50 µm or less. In the multilayer ceramic capacitor of the present preferred embodiment, for example, more preferably, the dimension in the width direction of the end surface covering portion is about 140 µm or more and about 160 µm or less, and the dimension in the length direction of the end surface covering portion is about 5 µm or more and about 15 µm or less.

The dimension in the width direction of the end surface covering portion and the dimension in the length direction of the end surface covering portion are each measured on a cross section passing through a central portion in the thickness direction of the body and extending along the length direction and the width direction, with an optical microscope or an electron microscope.

In the multilayer ceramic capacitor of the present preferred embodiment, preferably, a ratio of a dimension in the width direction of the end surface covering portion to a dimension in the width direction of the side surface covering portion is about 0.1 or more and about 20 or less, for example.

Preferably, a ratio of the dimension in the width direction W of the first end surface covering portion 60a to the dimension in the width direction W of the first side surface covering portion 50a is, for example, about 0.1 or more and about 20 or less.

Preferably, a ratio of the dimension in the width direction W of the second end surface covering portion 60b to the dimension in the width direction W of the first side surface covering portion 50a is, for example, about 0.1 or more and about 20 or less.

Preferably, a ratio of the dimension in the width direction W of the first end surface covering portion 60a to the dimension in the width direction W of the second side surface covering portion 50b is, for example, about 0.1 or more and about 20 or less.

Preferably, a ratio of the dimension in the width direction W of the second end surface covering portion 60b to the dimension in the width direction W of the second side surface covering portion 50b is, for example, about 0.1 or more and about 20 or less.

In the multilayer ceramic capacitor of the present invention, preferably, a ratio of a dimension in the length direction of the end surface covering portion to a dimension in the width direction of the side surface covering portion is, for example, about 0.1 or more and about 5 or less.

Preferably, a ratio of the dimension in the length direction L of the first end surface covering portion 60a to the dimension in the width direction W of the first side surface covering portion 50a is, for example, about 0.1 or more and about 5 or less.

Preferably, a ratio of the dimension in the length direction L of the second end surface covering portion 60b to the dimension in the width direction W of the first side surface covering portion 50a is, for example, about 0.1 or more and about 5 or less.

Preferably, a ratio of the dimension in the length direction L of the first end surface covering portion 60a to the dimension in the width direction W of the second side surface covering portion 50b is, for example, about 0.1 or more and about 5 or less.

Preferably, a ratio of the dimension in the length direction L of the second end surface covering portion 60b to the dimension in the width direction W of the second side surface covering portion 50b is, for example, about 0.1 or more and about 5 or less.

In the multilayer ceramic capacitor of the present preferred embodiment, preferably, the ratio of the dimension in the width direction of the end surface covering portion to the dimension in the width direction of the side surface covering portion is, for example, about 0.1 or more and about 20 or less, and the ratio of the dimension in the length direction of the end surface covering portion to the dimension in the width direction of the side surface covering portion is, for example, about 0.1 or more and about 5 or less.

The multilayer ceramic capacitor of the present preferred embodiment is produced by the following method, for example. The following describes an example of a method of producing the multilayer ceramic capacitor 1 shown in FIG. 1 and elsewhere, as an example of a method of producing a multilayer ceramic capacitor according to a preferred embodiment of the present invention.

Producing Laminate Chip

First, a dielectric ceramic material including, for example, a perovskite compound such as $BaTiO_3$, $CaTiO_3$, $SrTiO_3$, or $CaZrO_3$ as a main component is provided. Then, a dielectric powder made of the dielectric ceramic material is mixed with at least one additive selected from the group consisting of, for example, Si, Mg, and Ba, an organic binder, an organic solvent, a plasticizer, a dispersant, and the like at a predetermined ratio, such that a first ceramic slurry is produced.

Next, a first ceramic green sheet, a second ceramic green sheet, and a third ceramic green sheet are formed with the first ceramic slurry on a surface of a resin film.

The first ceramic green sheet, the second ceramic green sheet, and the third ceramic green sheet are formed, for example, by using a die coater, a gravure coater, or a micro gravure coater.

Next, conductive films are formed on surfaces of the first ceramic green sheet and the second ceramic green sheet.

Figure 7:
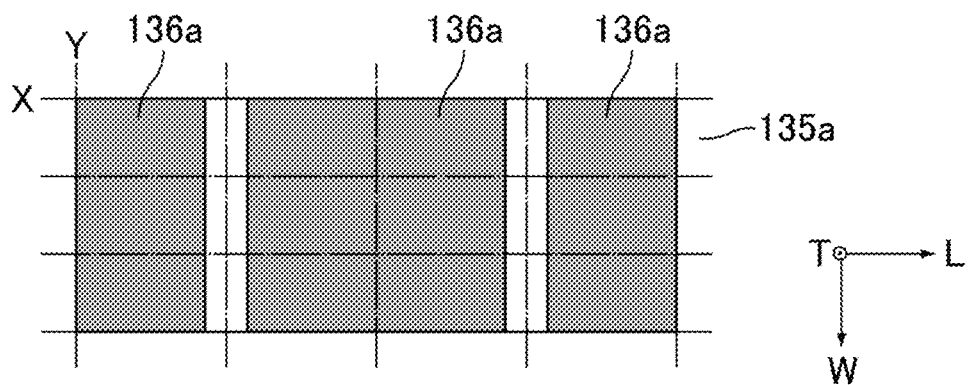
FIG. 7 is a schematic plan view of an example of a first ceramic green sheet including a first conductive film, which is obtained according to an example of a method of producing a multilayer ceramic capacitor according to a preferred embodiment of the present invention.
Figure 8:
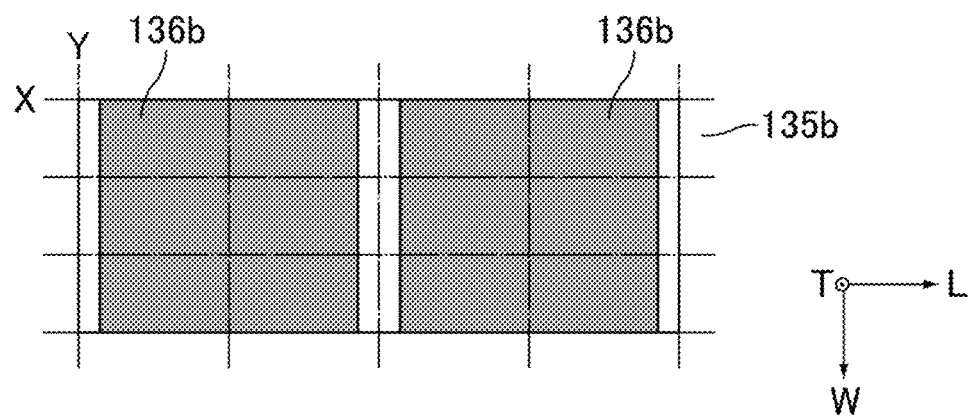
FIG. 8 is a schematic plan view of an example of a second ceramic green sheet including a second conductive film, which is obtained according to an example of a method of producing a multilayer ceramic capacitor according to a preferred embodiment of the present invention.
Figure 9:
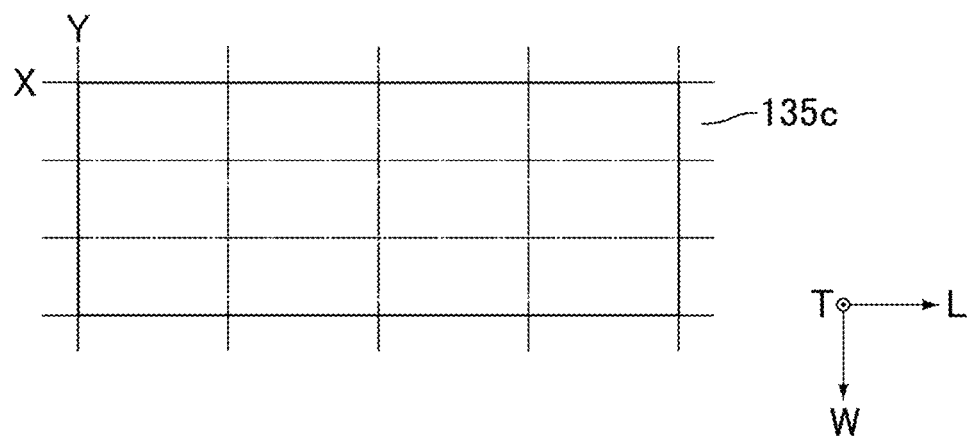
FIG. 9 is a schematic plan view of an example of a third ceramic green sheet, which is obtained according to an example of a method of producing a multilayer ceramic capacitor according to a preferred embodiment of the present invention.

FIG. 7 is a schematic plan view of an example of the first ceramic green sheet including a first conductive film, which is obtained according to an example of the method of producing a multilayer ceramic capacitor according to a preferred embodiment of the present invention. FIG. 8 is a schematic plan view of an example of the second ceramic green sheet including a second conductive film, which is obtained according to an example of the method of producing a multilayer ceramic capacitor according to a preferred embodiment of the present invention. FIG. 9 is a schematic plan view of an example of the third ceramic green sheet, which is obtained according to an example of the method of producing a multilayer ceramic capacitor according to a preferred embodiment of the present invention.

FIG. 7, FIG. 8, and FIG. 9 show cutting lines X and cutting lines Y used subsequently for singulation of multilayer ceramic capacitors 1. The cutting lines X are parallel or substantially parallel to the length direction L. The cutting lines Y are parallel or substantially parallel to the width direction W.

As shown in FIG. 7, an internal electrode layer conductive paste is applied in a stripe pattern in the width direction W to a surface of a first ceramic green sheet 135*a* and then dried, such that first conductive films 136*a*, which subsequently turn into the first internal electrode layers 36*a*, are formed on the surface of the first ceramic green sheet 135*a*. Thus, the first ceramic green sheet 135*a* with the first conductive films 136*a* is produced.

As shown in FIG. 8, the internal electrode layer conductive paste is applied in a stripe pattern in the width direction W to a surface of a second ceramic green sheet 135*b* and then dried, such that second conductive films 136*b*, which subsequently turn into the second internal electrode layers 36*b*, are formed on the surface of the second ceramic green sheet 135*b*. Thus, the second ceramic green sheet 135*b* with the second conductive films 136*b* is produced.

When the first ceramic green sheet 135*a* with the first conductive films 136*a* shown in FIG. 7 is superimposed on the second ceramic green sheet 135*b* with the second conductive films 136*b* shown in FIG. 8 in the thickness direction T, the first conductive films 136*a* and the second conductive films 136*b* have a positional relationship in which the regions partitioned by the cutting lines Y are shifted by one column in the length direction L relative to each other. In other words, the cutting line Y passing through the center of each first conductive film 136*a* passes through a region where the second conductive film 136*b* is not formed. The cutting line Y passing through the center of each second conductive film 136*b* passes through a region where the first conductive film 136*a* is not formed.

The internal electrode layer conductive paste is applied, for example, by a printing method such as screen printing, ink jet printing, or gravure printing.

The dimensions in the thickness direction T of each first conductive film 136*a* and each second conductive film 136*b* are each about 1.5 μm or less, for example.

In contrast, as shown in FIG. 9, no conductive films such as the first conductive films 136*a* or the second conductive films 136*b* are formed on a third ceramic green sheet 135*c*.

Next, the first ceramic green sheet 135*a* with the first conductive films 136*a*, the second ceramic green sheet 135*b* with the second conductive films 136*b*, and the third ceramic green sheet 135*c* with no conductive films are stacked in a mother laminate.

Figure 10:
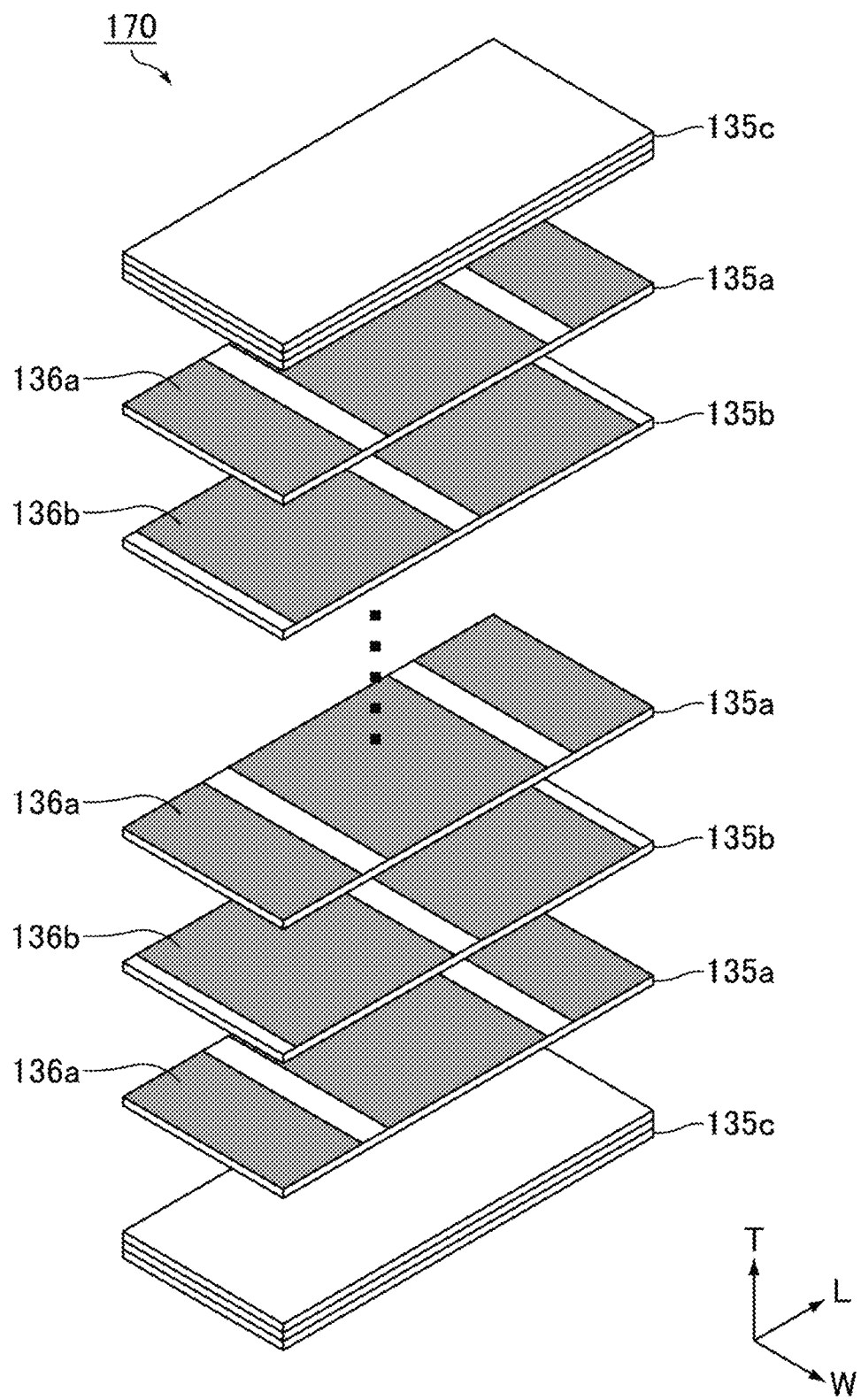
FIG. 10 is a schematic perspective view of a mother laminate in an exploded state, which is obtained according to an example of a method of producing a multilayer ceramic capacitor according to a preferred embodiment of the present invention.

FIG. 10 is a schematic perspective view of the mother laminate in an exploded state, which is obtained according to an example of the method of producing a multilayer ceramic capacitor according to a preferred embodiment of the present invention.

As shown in FIG. 10, first, a predetermined number (for example, three in FIG. 10) of the third ceramic green sheets 135*c* are stacked, on which a predetermined number of the first ceramic green sheets 135*a* with the first conductive films 136*a* and a predetermined number of the second ceramic green sheets 135*b* with the second conductive films 136*b* are alternately stacked in the thickness direction T, on which a predetermined number (three in FIG. 10) of the third ceramic green sheets 135*c* are further stacked. Thus, a mother laminate 170 is produced.

The numbers of the first ceramic green sheets 135*a* with the first conductive films 136*a* and the second ceramic green sheets 135*b* with the second conductive films 136*b* to be stacked are not limited and may be changed as appropriate.

There is no limitation on the number of the third ceramic green sheets 135*c* to be stacked on the top and bottom of the stack where the first ceramic green sheets 135*a* with the first conductive films 136*a* and the second ceramic green sheets 135*b* with the second conductive films 136*b* are alternated in the thickness direction T. The number may be changed as appropriate.

Subsequently, the mother laminate 170 is pressed, such that the first ceramic green sheets 135*a* with the first conductive films 136*a*, the second ceramic green sheets 135*b* with the second conductive films 136*b*, and the third ceramic green sheet 135*c* are pressure-bonded.

The mother laminate 170 is pressed, for example, by a method such as rigid body pressing, hydrostatic pressing, or the like.

Next, the mother laminate 170 is cut into multiple laminate chips.

Figure 11:
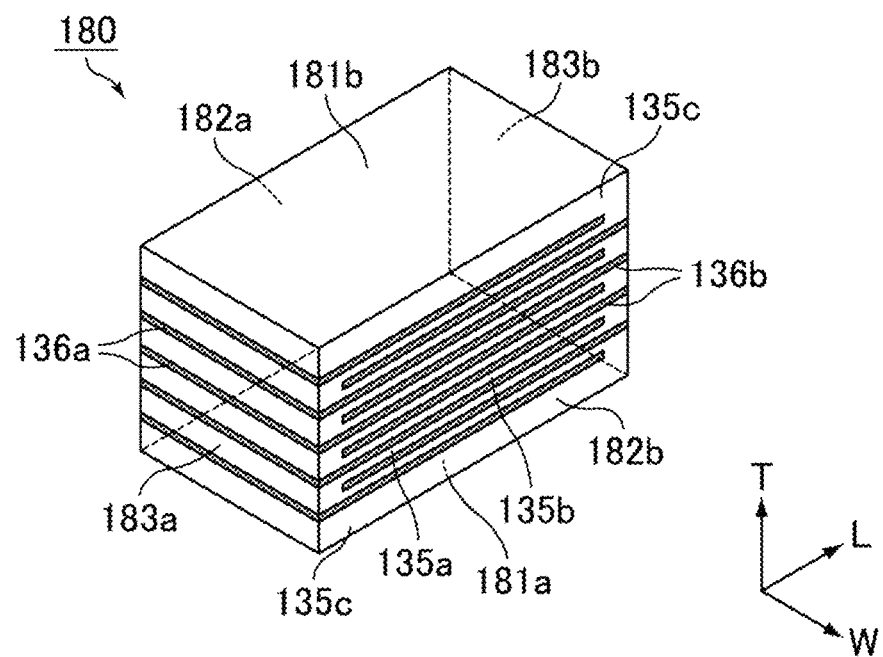
FIG. 11 is a schematic perspective view of an example of a laminate chip, which is obtained according to an example of a method of producing a multilayer ceramic capacitor according to a preferred embodiment of the present invention.

FIG. 11 is a schematic perspective view of an example of a laminate chip, which is obtained according to an example of the method of producing a multilayer ceramic capacitor according to a preferred embodiment of the present invention.

The mother laminate 170 is cut along the cutting lines X and the cutting lines Y (see FIG. 7, FIG. 8, and FIG. 9), such that multiple laminate chips 180 such as the one shown in FIG. 11 are produced.

The mother laminate 170 is cut, for example by a method such as press cutting, dicing, or laser cutting.

In each laminate chip 180, the stack where the first ceramic green sheets 135a with the first conductive films 136a and the second ceramic green sheets 135b with the second conductive films 136b are alternated in the thickness direction T is an unfired capacitance generating portion, which subsequently turns into the capacitance generating portion 30.

In the laminate chip 180, the stacks of the third ceramic green sheets 135c on the top and bottom of the unfired capacitance generating portion respectively define an unfired first main surface covering portion, which subsequently turns into the first main surface covering portion 40a, and an unfired second main surface covering portion, which subsequently turns into the second main surface covering portion 40b.

A first main surface 181a and a second main surface 181b of the laminate chip 180 are defined by surfaces of different third ceramic green sheets 135c.

A first side surface 182a and a second side surface 182b of the laminate chip 180 are surfaces exposed by cutting the mother laminate 170 along the cutting lines X.

The first conductive films 136a and the second conductive films 136b are exposed at the first side surface 182a of the laminate chip 180.

The first conductive films 136a and the second conductive films 136b are exposed at the second side surface 182b of the laminate chip 180.

A first end surface 183a and a second end surface 183b of the laminate chip 180 are surfaces exposed by cutting the mother laminate 170 along the cutting lines Y.

The first conductive films 136a are exposed at the first end surface 183a of the laminate chip 180, but the second conductive films 136b are not exposed thereat.

The second conductive films 136b are exposed at the second end surface 183b of the laminate chip 180, but the first conductive films 136a are not exposed thereat.

Producing Laminate Chip with Unfired Side Surface Covering Portions

Subsequently, a dielectric ceramic material including, for example, a perovskite compound such as $BaTiO_3$, $CaTiO_3$, $SrTiO_3$, or $CaZrO_3$ as a main component is provided. Then, a dielectric powder made of the dielectric ceramic material is mixed with at least one additive selected from the group consisting of, for example, Si, Mg, and Ba, an organic binder, an organic solvent, a plasticizer, a dispersant, and the like at a predetermined ratio, such that a second ceramic slurry is produced.

The second ceramic slurry and the first ceramic slurry may be made of the same or different materials.

Next, the second ceramic slurry is applied to a surface of a resin film and then dried, such that a side surface covering portion ceramic green sheet is produced. Subsequently, the side surface covering portion ceramic green sheet is peeled off from the resin film.

Then, the first side surface 182a of the laminate chip 180 is pressed against the side surface covering portion ceramic green sheet to cut out the side surface covering portion ceramic green sheet (bonded by thermal compression), such that an unfired first side surface covering portion, which subsequently turns into the first side surface covering portion 50a, is formed on the first side surface 182a of the laminate chip 180. Preferably, the first side surface 182a of the laminate chip 180 is pre-coated with an organic solvent that defines and functions as an adhesive.

The second side surface 182b of the laminate chip 180 is pressed against the side surface covering portion ceramic green sheet to cut out the side surface covering portion ceramic green sheet (bonded by thermal compression), such that an unfired second side surface covering portion, which subsequently turns into the second side surface covering portion 50b, is formed on the second side surface 182b of the laminate chip 180. Preferably, the second side surface 182b of the laminate chip 180 is pre-coated with an organic solvent that defines and functions as an adhesive.

Thus, a laminate chip with unfired side surface covering portions is produced.

The laminate chip including unfired side surface covering portions may be produced by a method different from the above-described method. For example, the unfired first side surface covering portion may be formed on the first side surface 182a of the laminate chip 180 by applying the second ceramic slurry to the first side surface 182a of the laminate chip 180 and then drying the second ceramic slurry. The unfired second side surface covering portion may be formed on the second side surface 182b of the laminate chip 180 by applying the second ceramic slurry to the second side surface 182b of the laminate chip 180 and then drying the second ceramic slurry.

Producing Laminate Chip with Unfired Side Surface Covering Portions and Unfired End Surface Covering Portions Subsequently, a dielectric ceramic material including, for example, a perovskite compound such as $BaTiO_3$, $CaTiO_3$, $SrTiO_3$, or $CaZrO_3$ as a main component is provided. Then, a dielectric powder made of the dielectric ceramic material is mixed with at least one additive selected from the group consisting of, for example, Si, Mg, and Ba, an organic binder, an organic solvent, a plasticizer, a dispersant, and the like at a predetermined ratio, whereby a third ceramic slurry is produced.

The third ceramic slurry and the first ceramic slurry may be made of the same or different materials.

The third ceramic slurry and the second ceramic slurry may be made of the same or different materials.

Next, the third ceramic slurry is applied to a surface of a resin film and then dried, such that an end surface covering portion ceramic green sheet is produced. Subsequently, the end surface covering portion ceramic green sheet is peeled off from the resin film.

Then, one end surface of the laminate chip with the unfired side surface covering portions, more specifically, the first end surface 183a of the laminate chip 180 is pressed against the end surface covering portion ceramic green sheet to cut out the end surface covering portion ceramic green sheet (bonded by thermal compression), such that an unfired first end surface covering portion, which subsequently turns into the first end surface covering portion 60a, is formed on the first end surface 183a of the laminate chip 180. Preferably, the first end surface 183a of the laminate chip 180 is pre-coated with an organic solvent that defines and functions as an adhesive.

Subsequently, a portion of the unfired first end surface covering portion is removed to allow the unfired first end surface covering portion to partially cover exposed portions of the first conductive films 136a, which are exposed at the first end surface 183a of the laminate chip 180. Preferably, the unfired first end surface covering portion is in contact with the unfired first side surface covering portion, so that the first side surface covering portion 50a and the first end surface covering portion 60a, which are obtained subsequently, can be formed in contact with each other. Preferably, the unfired first end surface covering portion is in contact with the unfired second side surface covering portion, so that the second side surface covering portion 50b and the first end surface covering portion 60a, which are obtained subsequently, can be formed in contact with each other.

The other end surface of the laminate chip with the unfired side surface covering portions, more specifically, the second end surface 183b of the laminate chip 180 is pressed against the end surface covering portion ceramic green sheet to cut out the end surface covering portion ceramic green sheet (bonded by thermal compression), such that an unfired second end surface covering portion, which subsequently turns into the second end surface covering portion 60b, is formed on the second end surface 183b of the laminate chip 180. Preferably, the second end surface 183b of the laminate chip 180 is pre-coated with an organic solvent that defines and functions as an adhesive.

Subsequently, a portion of the unfired second end surface covering portion is removed to allow the unfired second end surface covering portion to partially cover exposed portion of the second conductive films 136b, which are exposed at the second end surface 183b of the laminate chip 180. Preferably, the unfired second end surface covering portion is in contact with the unfired first side surface covering portion, so that the first side surface covering portion 50a and the second end surface covering portion 60b, which are obtained subsequently, can be formed in contact with each other. Preferably, the unfired second end surface covering portion is in contact with the unfired second side surface covering portion, so that the second side surface covering portion 50b and the second end surface covering portion 60b, which are obtained subsequently, can be formed in contact with each other.

Thus, a laminate chip with unfired side surface covering portions and unfired end surface covering portions is produced.

The laminate chip with the unfired side surface covering portions and the unfired end surface covering portions may be produced by a method different from the above-described method. For example, the unfired first end surface covering portion may be formed on the first end surface 183a of the laminate chip 180 by applying the third ceramic slurry to the first end surface 183a of the laminate chip 180 in such a manner that the third ceramic slurry partially covers exposed portions of the first conductive films 136a, which are exposed at the first end surface 183a of the laminate chip 180, and then drying the third ceramic slurry.

The unfired second end surface covering portion may be formed on the second end surface 183b of the laminate chip 180 by applying the third ceramic slurry to the second end surface 183b of the laminate chip 180 such that the third ceramic slurry partially covers exposed portions of the second conductive films 136b, which are exposed at the second end surface 183b of the laminate chip 180, and then drying the third ceramic slurry.

As described above, in the producing a laminate chip with unfired side surface covering portions, the first side surface 182a of the laminate chip 180 is pressed against the side surface covering portion ceramic green sheet to cut out the side surface covering portion ceramic green sheet (bonded by thermal compression), such that the unfired first side surface covering portion is formed on the first side surface 182a of the laminate chip 180. Here, while the unfired first side surface covering portion is formed, a portion of the second ceramic slurry forming the unfired first side surface covering portion is softened during thermal compression bonding and extends to a portion of each of the first end surface 183a and the second end surface 183b of the laminate chip 180, with the result that while the unfired first end surface covering portion may be formed on a portion (adjacent to the first side surface 182a) of the first end surface 183a of the laminate chip 180, an unfired second end surface covering portion may be formed on a portion (adjacent to the first side surface 182a) of the second end surface 183b of the laminate chip 180. Thus, the unfired first side surface covering portion and the unfired first end surface covering portion are integrally formed, so that the first side surface covering portion 50a and the first end surface covering portion 60a, which are obtained subsequently, will be integrally formed. Since the unfired first side surface covering portion and the unfired second end surface covering portion are integrally formed, the first side surface covering portion 50a and the second end surface covering portion 60b, which are obtained subsequently, will be integrally formed.

Further, a portion of the second ceramic slurry forming the unfired first side surface covering portion is softened during thermal compression bonding and extends to a portion of each of the first main surface 181a and the second main surface 181b of the laminate chip 180, with the result that another unfired first main surface covering portion different from the unfired first main surface covering portion included in the laminate chip 180 may be formed on a portion (adjacent to the first side surface 182a) of the first main surface 181a of the laminate chip 180 while another unfired second main surface covering portion different from the unfired second main surface covering portion included in the laminate chip 180 may be formed on a portion (adjacent to the first side surface 182a) of the second main surface 181b of the laminate chip 180.

As described above, in the producing a laminate chip with unfired side surface covering portions, the second side surface 182b of the laminate chip 180 is pressed against the side surface covering portion ceramic green sheet to cut out the side surface covering portion ceramic green sheet (bonded by thermal compression), such that the unfired second side surface covering portion is formed on the second side surface 182b of the laminate chip 180. Here, while the unfired second side surface covering portion is formed, a portion of the second ceramic slurry forming the unfired second side surface covering portion is softened during thermal compression bonding and extends to a portion of each of the first end surface 183a and the second end surface 183b of the laminate chip 180, with the result that while the unfired first end surface covering portion may be formed on a portion (adjacent to the second side surface 182b) of the first end surface 183a of the laminate chip 180, an unfired second end surface covering portion may be formed on a portion (adjacent to the second side surface 182b) of the second end surface 183b of the laminate chip 180. Thus, the unfired second side surface covering portion and the unfired first end surface covering portion are integrally formed, so that the second side surface covering portion 50b and the first end surface covering portion 60a, which are obtained subsequently, will be integrally formed. Since the unfired second side surface covering portion and the unfired second end surface covering portion are integrally formed, the second side surface covering portion 50b and the second end surface covering portion 60b, which are obtained subsequently, will be integrally formed.

Further, a portion of the second ceramic slurry forming the unfired second side surface covering portion is softened during thermal compression bonding and extends to a portion of each of the first main surface 181a and the second main surface 181b of the laminate chip 180, with the result that another unfired first main surface covering portion different from the unfired first main surface covering portion included in the laminate chip 180 may be formed on a portion (adjacent to the second side surface 182b) of the first main surface 181a of the laminate chip 180 while another unfired second main surface covering portion different from the unfired second main surface covering portion included in the laminate chip 180 may be formed on a portion (adjacent to the second side surface 182b) of the second main surface 181b of the laminate chip 180.

Producing Body

The laminate chip with the unfired side surface covering portions and the unfired end surface covering portions are degreased under predetermined conditions in, for example, a nitrogen atmosphere, and then fired at a predetermined temperature in, for example, a nitrogen-hydrogen-water vapor mixed atmosphere. Thus, the unfired capacitance generating portion, the unfired first main surface covering portion, the unfired second main surface covering portion, the unfired first side surface covering portion, the unfired second side surface covering portion, the unfired first end surface covering portion, and the unfired second end surface covering portion turn into the capacitance generating portion 30, the first main surface covering portion 40a, the second main surface covering portion 40b, the first side surface covering portion 50a, the second side surface covering portion 50b, the first end surface covering portion 60a, and the second end surface covering portion 60b, respectively. As a result, the body 10 is produced.

In producing the body 10, as described above, all of the following members may be fired simultaneously or separately, or one or some of the following members may be fired separately: the laminate chip 180 including the unfired capacitance generating portion, the unfired first main surface covering portion, and the unfired second main surface covering portion; and the unfired side surface covering portion including the unfired first side surface covering portion and the unfired second side surface covering portion; and the unfired end surface covering portion including the unfired first end surface covering portion and the unfired second end surface covering portion. In a preferred embodiment in which one or some of the members are fired separately, for example, a laminate chip with unfired side surface covering portions is fired first, i.e., the laminate chip 180 and unfired side surface covering portions are fired simultaneously, and then unfired end surface covering portions are formed and fired.

Forming External Electrodes

An external electrode conductive paste is applied to the first end surface 13a of the body 10 and baked. The external electrode conductive paste is applied to the first end surface 13a of the body 10 and baked such that the external electrode conductive paste covers the first exposed portion 37a of each first internal electrode layer 36a and the first end surface covering portion 60a and is connected to the first internal electrode layers 36a, whereby a base electrode layer connected to the first internal electrode layer 36a is formed.

The external electrode conductive paste is also applied to the second end surface 13b of the body 10 and baked. The external electrode conductive paste is applied to the second end surface 13b of the body 10 and baked such that the external electrode conductive paste covers the second exposed portion 37b of each second internal electrode layer 36b and the second end surface covering portion 60b and is connected to the second internal electrode layers 36b, such that a base electrode layer connected to the second internal electrode layer 36b is formed.

Examples of the external electrode conductive paste include a conductive paste including, for example, Cu as a main component.

A Ni plating electrode layer and a Sn plating electrode layer, for example, are sequentially formed on a surface of the base electrode layer on each of the first end surface 13a and the second end surface 13b of the body 10.

Thus, the first external electrode 20a and the second external electrode 20b are formed.

In the method described above, the first external electrode 20a and the second external electrode 20b are formed separately from the body 10 by the post-firing method. More specifically, the first external electrode 20a and the second external electrode 20b are formed after the body 10 is produced.

A portion of the first external electrode 20a and a portion of the second external electrode 20b may be formed simultaneously with the body 10 by the co-firing method instead of the method described above. In this case, first, the external electrode conductive paste is applied to the end surfaces of a laminate chip with unfired side surface covering portions and unfired end surface covering portions. Next, the laminate chip with the unfired side surface covering portions and the unfired end surface covering portions, which is coated with the external electrode conductive paste, is fired. Thus, the laminate chip with the unfired side surface covering portions and the unfired end surface covering portions as well as the external electrode conductive paste are fired. As a result, the body 10 and the base electrode layers defining portions of the first external electrode 20a and the second external electrode 20b are formed simultaneously. Subsequently, a Ni plating electrode layer and a Sn plating electrode layer are sequentially formed on a surface of each base electrode layer.

Thus, the multilayer ceramic capacitor 1 shown in FIG. 1 and elsewhere is produced.

EXAMPLES

The following shows and describes examples that more specifically disclose multilayer ceramic capacitors according to preferred embodiments of the present invention. The present invention is not limited to the following examples.

Examples 1 to 10

In the multilayer ceramic capacitor 1 shown in FIG. 1 and elsewhere, the dimensions were set as shown in Table 1, such that the multilayer ceramic capacitors of Examples 1 to 10 were produced. In each of the multilayer ceramic capacitors of Examples 1 to 10, the first end surface covering portion and the second end surface covering portion had the same or substantially the same dimensions. In each of the multilayer ceramic capacitors of Examples 1 to 10, the first side surface covering portion and the second side surface covering portion had the same or substantially the same dimensions.

Comparative Example 1

In the multilayer ceramic capacitor 1 shown in FIG. 1 and elsewhere, the dimensions were set according to Table 1 without forming the end surface covering portions, such that the multilayer ceramic capacitor of Comparative Example 1 was produced. In the multilayer ceramic capacitor of Comparative Example 1, the first side surface covering portion and the second side surface covering portion had the same or substantially the same dimensions.

Evaluation

The multilayer ceramic capacitors of Examples 1 to 10 and Comparative Example 1 were evaluated as follows. Table 1 shows the results.

Moisture Resistance

The insulation resistance after a moisture resistance test was evaluated as the moisture resistance of the multilayer ceramic capacitor. Specifically, each multilayer ceramic capacitor was subjected to a moisture resistance test in which a voltage of about 6.3 V was applied for about 500 hours under an environment at a temperature of about 85° C. and a humidity of about 85%. After the moisture resistance test, the insulation resistance was measured using an insulation resistance meter. The criteria are as follows.

Excellent: Insulation resistance was about $10^8$ MΩ or more.
Good: Insulation resistance was about $10^7$ MΩ or more and less than about $10^8$ MΩ.
Acceptable: Insulation resistance was about $10^6$ MΩ or more and less than about $10^7$ MΩ.
Poor: Insulation resistance was less than about $10^6$ MΩ.

Change in Capacitance Over Time

Each multilayer ceramic capacitor was subjected to an aging test for about 24 hours. Then, the capacitance was measured using a C-meter. The criteria are as follows.

Excellent: Capacitance was at least about 1.1 times the standard value.
Good: Capacitance was at least about 0.9 times to less than about 1.1 times the standard value.
Acceptable: Capacitance was more than about 0.8 times to less than about 0.9 times the standard value.
Poor: Capacitance was not more than about 0.8 times the standard value.

TABLE 1

|  | Dimension EW in width direction of end surface covering portion (um) | Dimension EL in length direction of end surface covering portion (um) | Dimension SW in width direction of side surface covering portion (um) | EW/SW | EL/SW | Moisture resistance | Change in capacitance over time |
| --- | --- | --- | --- | --- | --- | --- | --- |
| Example 1 | 6 | 6 | 49 | 0.1 | 0.1 | Good | Excellent |
| Example 2 | 147 | 32 | 15 | 10 | 2.1 | Good | Excellent |
| Example 3 | 198 | 53 | 11 | 18 | 4.8 | Good | Excellent |
| Example 4 | 6 | 7 | 49 | 0.1 | 0.1 | Good | Excellent |
| Example 5 | 155 | 35 | 16 | 10 | 2.2 | Good | Excellent |
| Example 6 | 194 | 49 | 10 | 19 | 4.8 | Excellent | Excellent |
| Example 7 | 5 | 6 | 50 | 0.1 | 0.1 | Good | Good |
| Example 8 | 151 | 15 | 15 | 10 | 1.0 | Excellent | Good |
| Example 9 | 184 | 49 | 10 | 18 | 4.8 | Excellent | Good |
| Example 10 | 245 | 97 | 10 | 25 | 9.7 | Excellent | Poor |
| Comparative Example 1 | 0 | 0 | 11 | 0 | 0 | Poor | Excellent |

As shown in Table 1, the multilayer ceramic capacitors of Examples 1 to 10 each including the end surface covering portions exhibited excellent moisture resistance. In addition, the multilayer ceramic capacitors of Examples 1 to 9 also showed a reduced change in capacitance over time.

In contrast, the multilayer ceramic capacitor of Comparative Example 1 not including the end surface covering portions exhibited poor moisture resistance, as compared to the multilayer ceramic capacitors of Examples 1 to 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a body including dielectric ceramic layers and internal electrode layers; and
   an external electrode; wherein
   the body includes:
      a capacitance generating portion at which the dielectric ceramic layers and the internal electrode layers are alternately stacked in a thickness direction;
      a main surface covering portion on a main surface of the capacitance generating portion in the thickness direction;
      a side surface covering portion on a side surface of the capacitance generating portion in a width direction perpendicular or substantially perpendicular to the thickness direction; and
      an end surface covering portion on an end surface of the capacitance generating portion in a length direction perpendicular or substantially perpendicular to the thickness direction and the width direction;
   each of the internal electrode layers includes an exposed portion exposed at the end surface of the capacitance generating portion;
   the end surface covering portion is on the end surface of the capacitance generating portion and partially covers the exposed portion of each internal electrode layer;
   the external electrode is connected to the internal electrode layers and covers the end surface covering portion and a portion of the exposed portion of each internal electrode layer, the portion of the exposed portion not being covered by the end surface covering portion;
   the external electrode directly covers the main surface covering portion in the thickness direction; and
   the end surface covering portion does not cover the main surface covering portion in the thickness direction.

2. The multilayer ceramic capacitor according to claim 1, wherein
   the dielectric ceramic layers include a first dielectric ceramic layer and a second dielectric ceramic layer;

the internal electrode layers include a first internal electrode layer and a second internal electrode layer;

the capacitance generating portion includes the first dielectric ceramic layer, the first internal electrode layer, the second dielectric ceramic layer, and the second internal electrode layer that are sequentially stacked in the thickness direction, and the capacitance generating portion includes a first main surface and a second main surface opposite to each other in the thickness direction, a first side surface and a second side surface opposite to each other in the width direction, and a first end surface and a second end surface opposite to each other in the length direction;

the first internal electrode layer includes a first exposed portion exposed at the first end surface of the capacitance generating portion;

the second internal electrode layer includes a second exposed portion exposed at the second end surface of the capacitance generating portion;

the main surface covering portion includes a first main surface covering portion on the first main surface of the capacitance generating portion and a second main surface covering portion on the second main surface of the capacitance generating portion;

the side surface covering portion includes a first side surface covering portion on the first side surface of the capacitance generating portion and a second side surface covering portion on the second side surface of the capacitance generating portion;

the end surface covering portion includes a first end surface covering portion on the first end surface of the capacitance generating portion to partially cover the first exposed portion of the first internal electrode layer, and a second end surface covering portion on the second end surface of the capacitance generating portion to partially cover the second exposed portion of the second internal electrode layer; and the external electrode includes a first external electrode connected to the first internal electrode layer and covering the first end surface covering portion and a portion of the first exposed portion of the first internal electrode layer, the portion of the first exposed portion not being covered by the first end surface covering portion, and a second external electrode connected to the second internal electrode layer and covering the second end surface covering portion and a portion of the second exposed portion of the second internal electrode layer, the portion of the second exposed portion not being covered by the second end surface covering portion.

3. The multilayer ceramic capacitor according to claim 2, wherein the first internal electrode layer and the second internal electrode layer are made of different materials.

4. The multilayer ceramic capacitor according to claim 2, wherein the first internal electrode layer and the second internal electrode layer are made of a same material.

5. The multilayer ceramic capacitor according to claim 1, wherein the side surface covering portion is in contact with the end surface covering portion.

6. The multilayer ceramic capacitor according to claim 5, wherein the side surface covering portion is integrated with the end surface covering portion.

7. The multilayer ceramic capacitor according to claim 1, wherein a dimension in the width direction of the end surface covering portion is about 5 μm or more and about 200 μm or less.

8. The multilayer ceramic capacitor according to claim 7, wherein the dimension in the width direction of the end surface covering portion is about 140 μm or more and about 160 μm or less.

9. The multilayer ceramic capacitor according to claim 1, wherein a dimension in the length direction of the end surface covering portion is about 5 μm or more and about 50 μm or less.

10. The multilayer ceramic capacitor according to claim 9, wherein the dimension in the length direction of the end surface covering portion is about 5 μm or more and about 15 μm or less.

11. The multilayer ceramic capacitor according to claim 1, wherein a dimension in the width direction of the side surface covering portion is about 10 μm or more and about 50 μm or less.

12. The multilayer ceramic capacitor according to claim 1, wherein a ratio of a dimension in the width direction of the end surface covering portion to a dimension in the width direction of the side surface covering portion is about 0.1 or more and about 20 or less.

13. The multilayer ceramic capacitor according to claim 1, wherein a ratio of a dimension in the length direction of the end surface covering portion to a dimension in the width direction of the side surface covering portion is about 0.1 or more and about 5 or less.

14. The multilayer ceramic capacitor according to claim 1, wherein a dimension in the thickness direction of the main surface covering portion is about 28 μm or more and about 80 μm or less.

15. The multilayer ceramic capacitor according to claim 1, wherein a dimension in the thickness direction of the body is about 0.150 mm or more and about 0.800 mm or less.

16. The multilayer ceramic capacitor according to claim 1, wherein a dimension in the width direction of the body is about 0.150 mm or more and about 0.800 mm or less.

17. The multilayer ceramic capacitor according to claim 1, wherein a dimension in the length direction of the body is about 0.350 mm or more and about 1.600 mm or less.

18. The multilayer ceramic capacitor according to claim 1, wherein each of the dielectric ceramic layers includes $BaTiO_3$, $CaTiO_3$, $SrTiO_3$, or $CaZrO_3$, as a main component.

19. The multilayer ceramic capacitor according to claim 18, wherein each of the dielectric ceramic layers includes a Mn compound, a Fe compound, a Cr compound, a Co compound, or a Ni compound, as an auxiliary component.

20. The multilayer ceramic capacitor according to claim 1, wherein each of the internal electrode layers includes at least one of Ni, Cu, Ag, Pd, Ag—Pd alloys, or Au.

* * * * *